Oct. 8, 1968    J. R. PROFFITT, JR    3,404,624
OFFSET PLATE DECORATING METHODS AND APPARATUS
Filed June 1, 1964    8 Sheets-Sheet 1
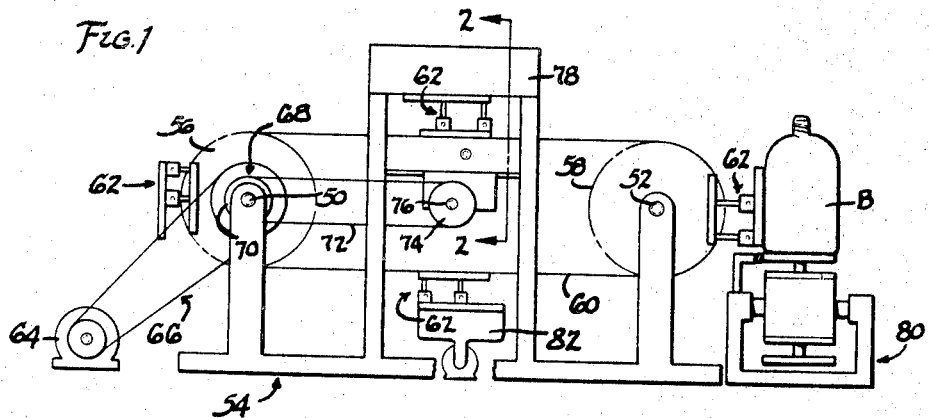
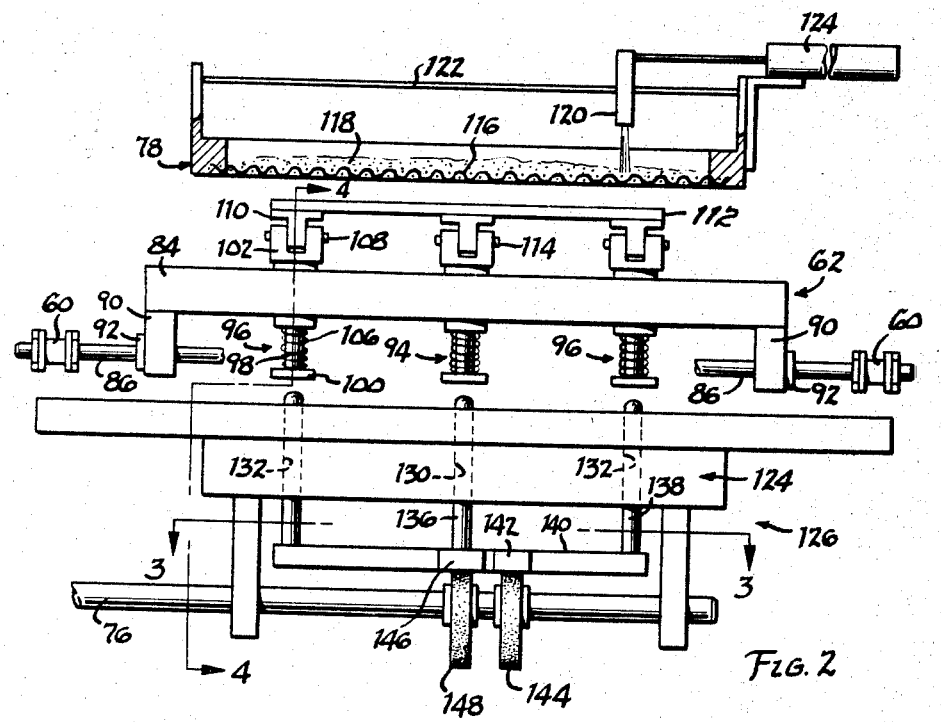
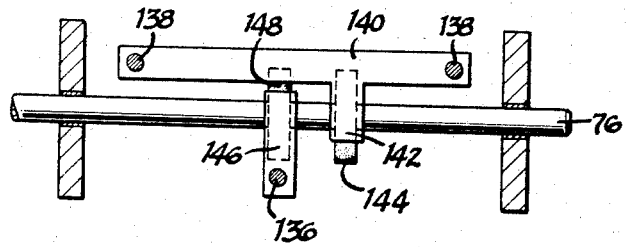
INVENTOR.
JAMES R. PROFFITT, JR.
BY
ATTORNEYS Oct. 8, 1968  J. R. PROFFITT, JR  3,404,624
OFFSET PLATE DECORATING METHODS AND APPARATUS
Filed June 1, 1964  8 Sheets-Sheet 2

INVENTOR.
JAMES R. PROFFITT, JR.
BY J. R. Nelson and
W. A. Schuch
ATTORNEYS

Oct. 8, 1968  J. R. PROFFITT, JR  3,404,624
OFFSET PLATE DECORATING METHODS AND APPARATUS
Filed June 1, 1964  8 Sheets-Sheet 3
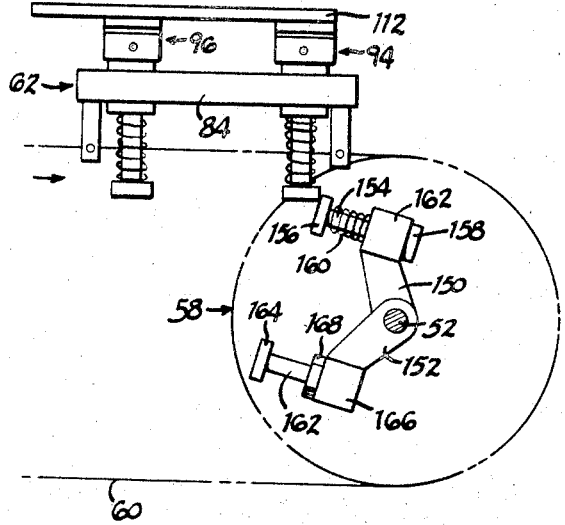
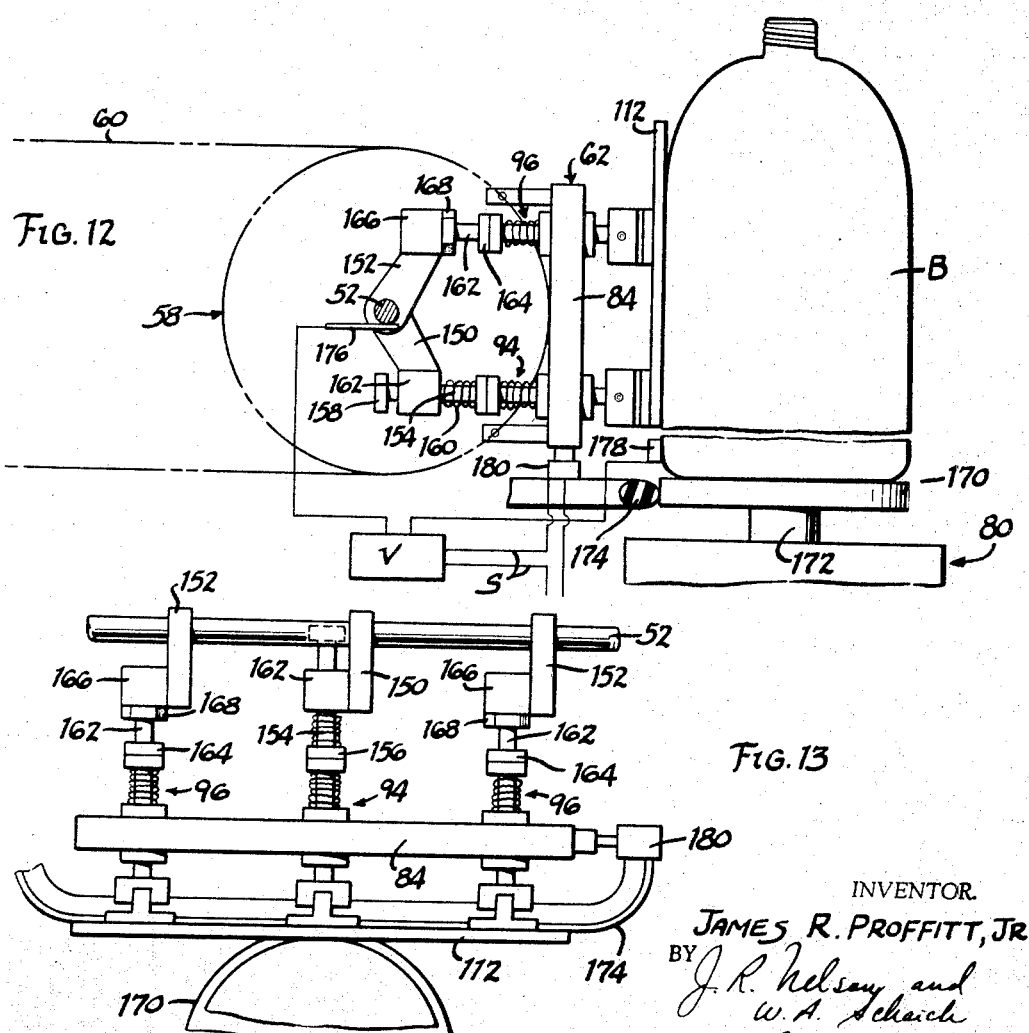
INVENTOR.
JAMES R. PROFFITT, JR.
ATTORNEYS

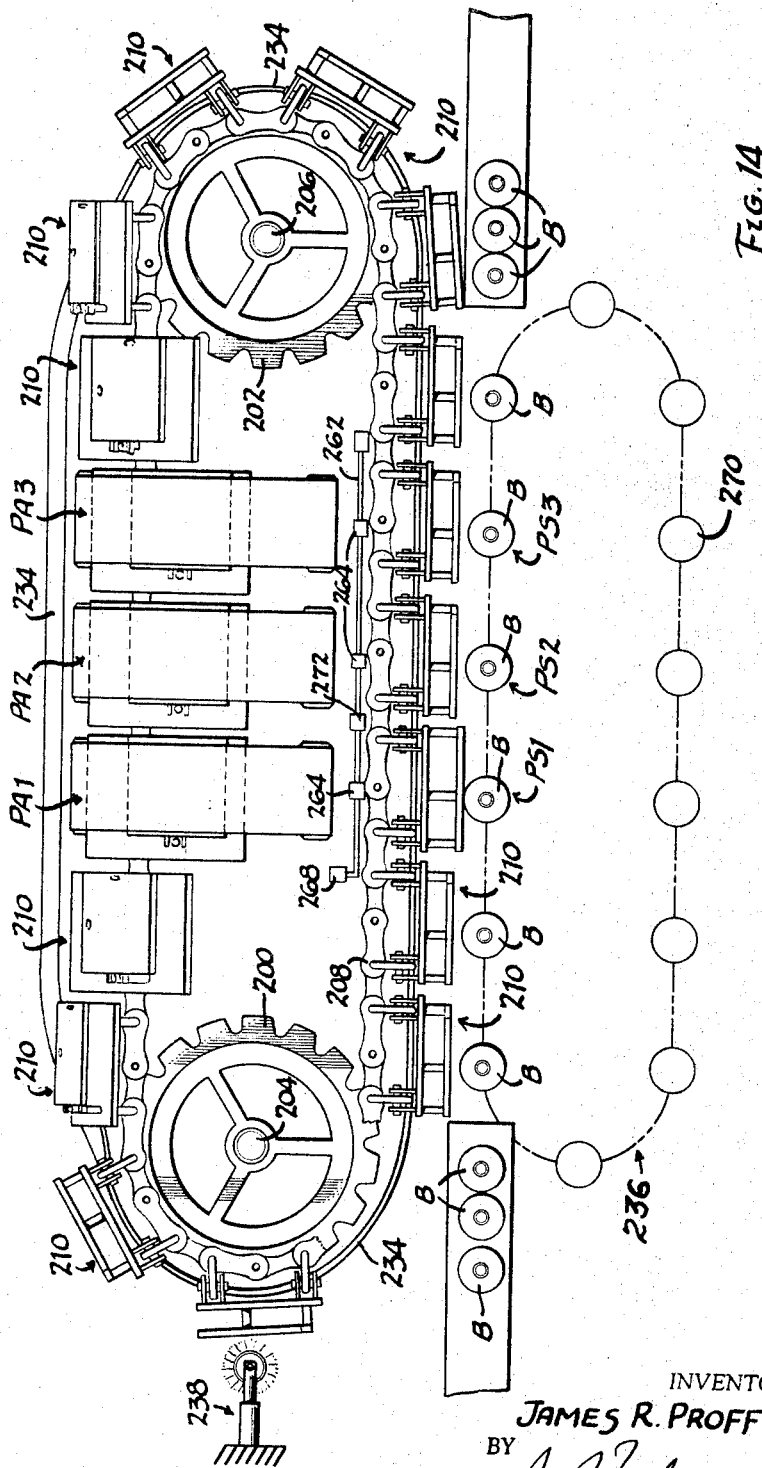

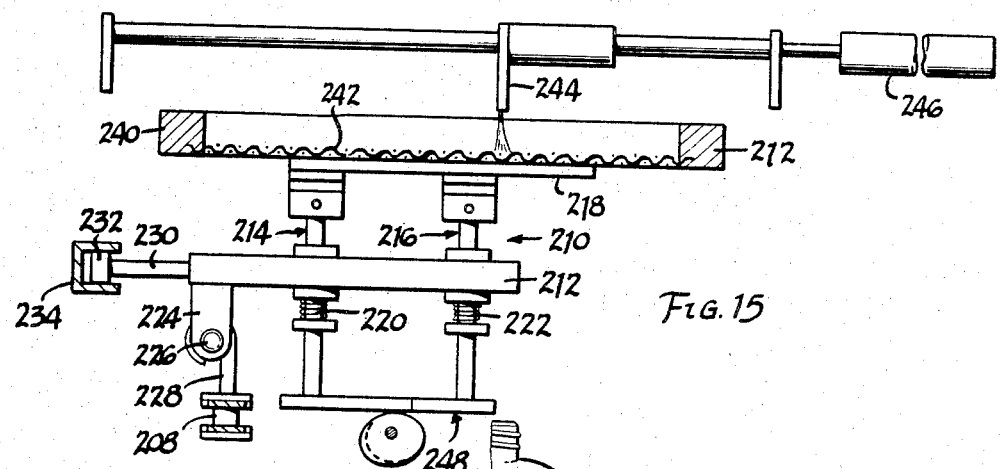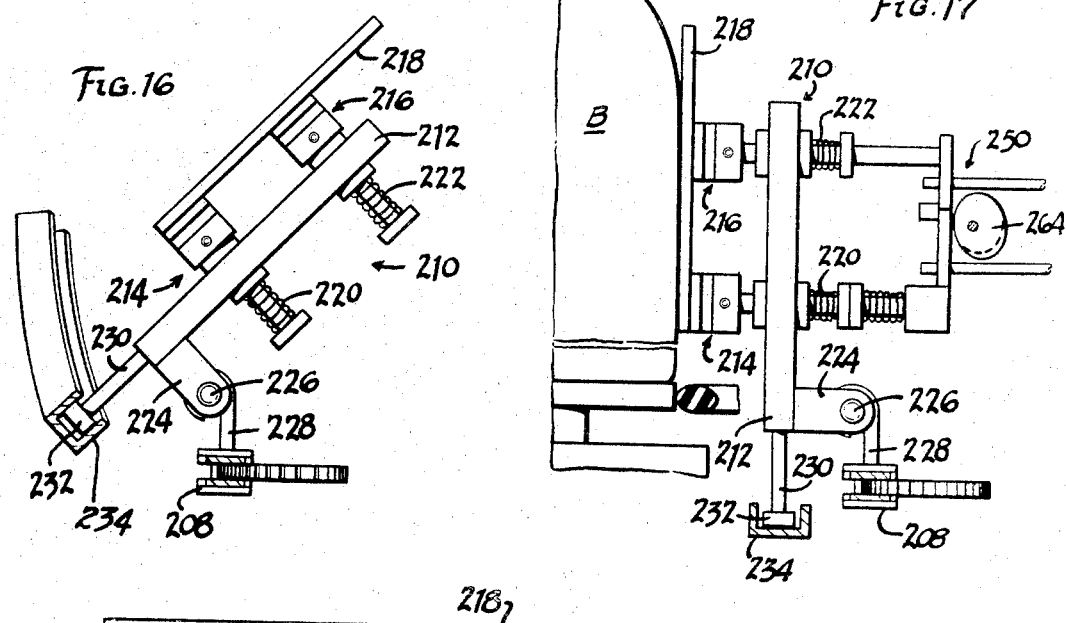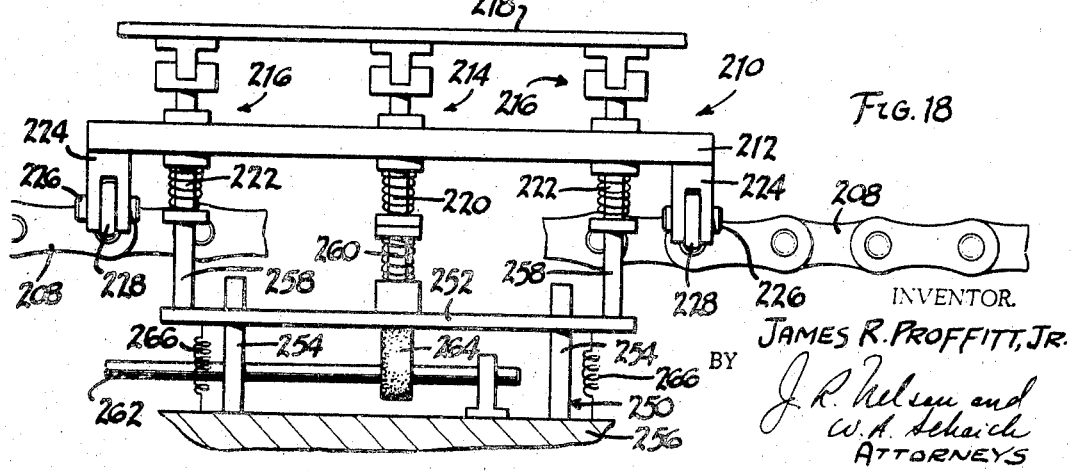

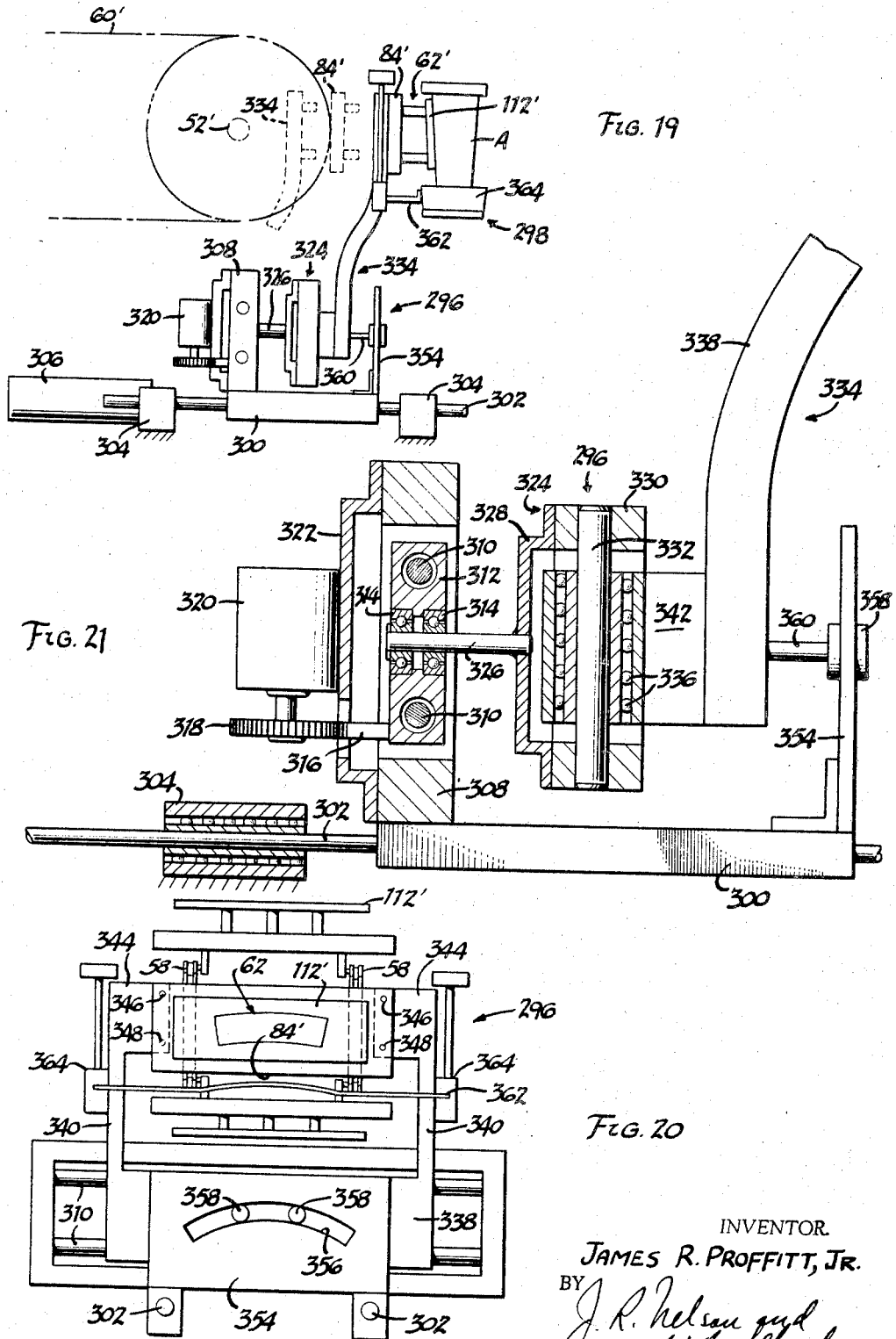

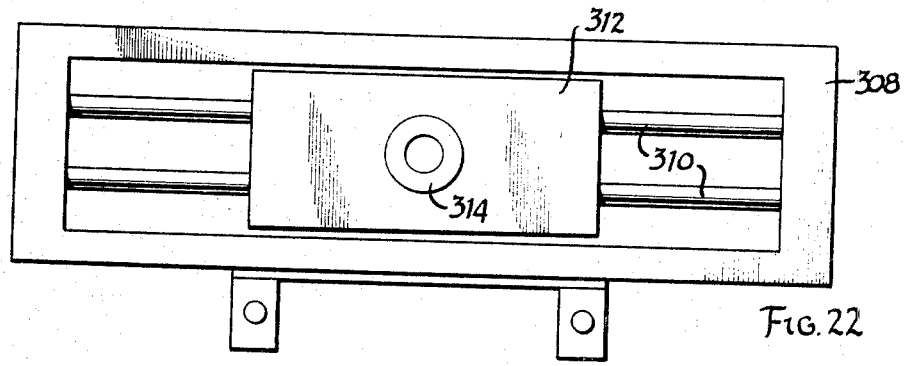
FIG. 22
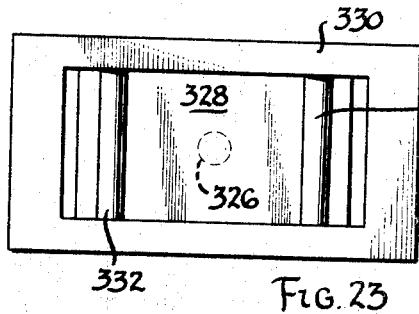
FIG. 23
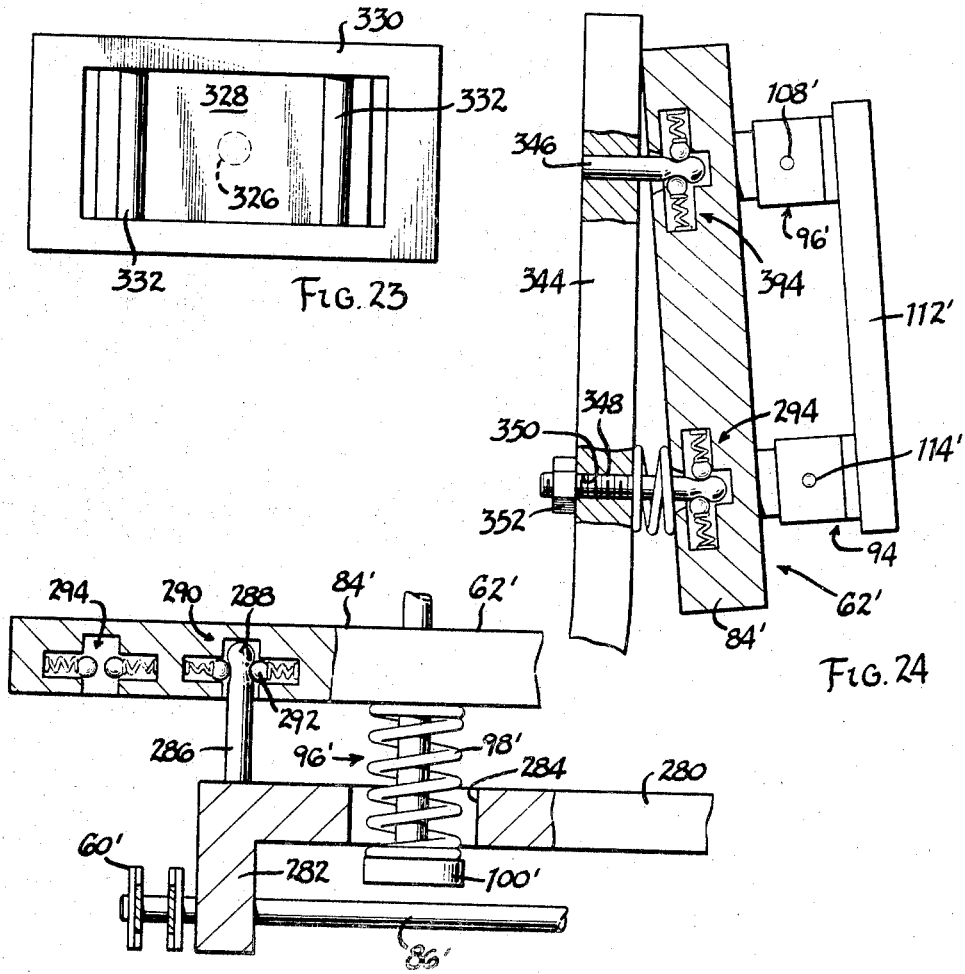
FIG. 24
FIG. 25
INVENTOR.
JAMES R. PROFFITT, JR.
BY
J. R. Nelson and
W. A. Scheich
ATTORNEYS

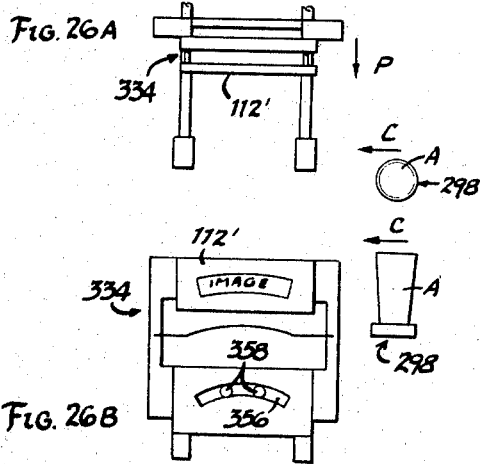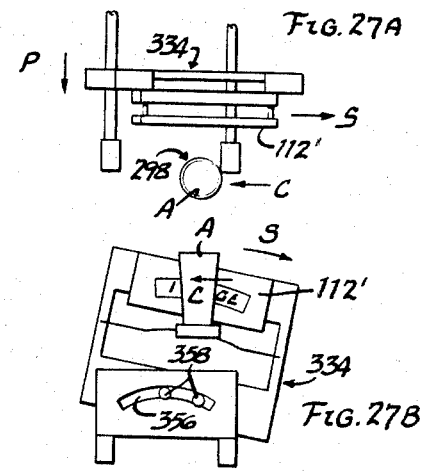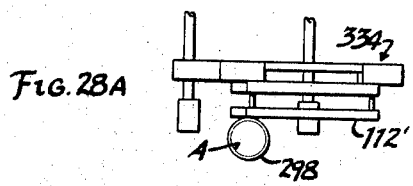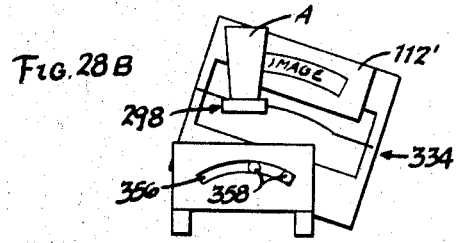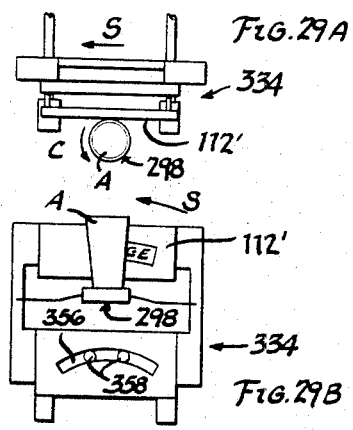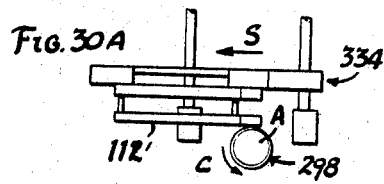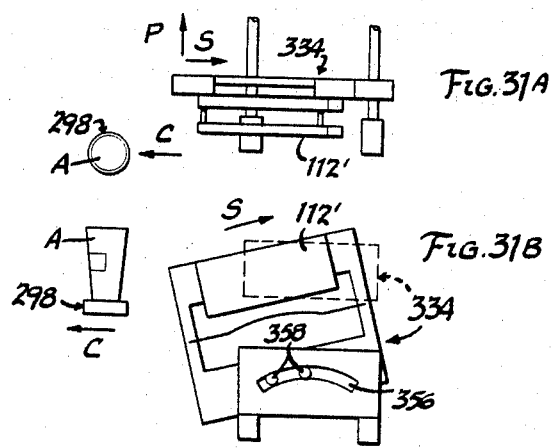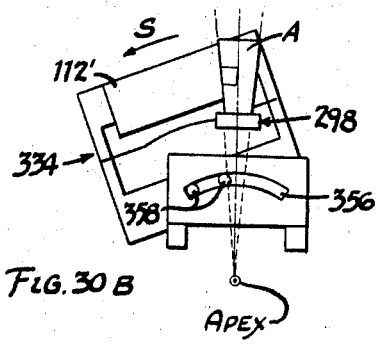

United States Patent Office 3,404,624
Patented Oct. 8, 1968

3,404,624
OFFSET PLATE DECORATING METHODS AND APPARATUS
James R. Proffitt, Jr., Sylvania, Ohio, assignor to Owens-Illinois, Inc., a corporation of Ohio
Filed June 1, 1964, Ser. No. 371,318
36 Claims. (Cl. 101—40)

ABSTRACT OF THE DISCLOSURE

Offset plate decorating methods and apparatus particularly directed to the manipulating and handling of offset plate elements in production line electrostatic printing operations. Offset plate assemblies are mounted upon an endless conveyor to be carried into successive registry with an image application station at which a powder image is placed on the plate and a printing station at which the powder image is electrostatically transferred from the plate to an article surface.

---

The present invention is especially concerned with the decorating of surfaces of revolution of glass articles such as the side surfaces of tumblers or bottles. The invention is particularly well adapted for employement in the electrostatic printing or decorating of hot glass surfaces by the techniques disclosed in the United States patent application of William H. Wood, Ser. No. 242,230, filed Dec. 4, 1962, and assigned to the assignee of this application. It will be apparent, however, that this invention has utility in processes other than that described in the Wood application.

In the decorating of hot glass articles, such as tumblers or bottles in accordance with the Wood disclosure, colorant frit particles or printing powder particles are applied to an offset plate by placing the plate in contact with a stencil screen having apertures conformed to the desired shape of the image and expressing the particles through the screen by brushing. After a layer of particles of the desired thickness has been applied to the offset plate in the foregoing manner, the plate is withdrawn from the screen and is placed in registry with the surface of the article to be decorated. In the case where the surface to be decorated is a surface of revolution, the usual practice is to initiate a rolling action between the article surface and the plate which causes the article surface to be rolled laterally across the image-shaped layer of powder particles. During this rolling action, an electric potential is applied across the plate and article to electrically transfer the particles from the surface of the plate to the surface of the article. Because of the electrical attraction of the particles to the article surface, it is not necessary that the surface and plate contact each other during the transfer.

From the standpoint of convenience, the applying of the powder image to the surface of the offset plate is best done by disposing the stencil screen in a horizontal position and bringing the offset plate upwardly into contact with the lower side of the screen. From the standpoint of decorating the hot glass articles while they still possess sufficient residual heat from the forming operation, it is most convenient to decorate the articles while they are in a normal upright position, because this is the position in which they normally issue from the forming machine and handling of the hot, and sometimes still soft article, is minimized.

One problem encountered in applying a powder image to an offset plate by the use of a stencil screen has been that of smearing of the powder layer, especially along image edges, during the withdrawal of the plate from the screen after the image has been placed on the plate.

While the problems of smearing and the positioning of the plate relative to the screen and to the article being decorated are not of particular concern in laboratory scale operations, they are of substantial concern when viewed from the standpoint of decorating articles at the relatively high output rate of existing glass article forming machines.

In order to efficiently utilize the residual heat from the forming operation, the decorating of the article should be done directly after the article is issued from the forming machine, and the decorating process must not only be capable of operating at a rate matching the forming machine output but must do so with a reliability good enough to minimize the rejection of articles solely for imperfections in decoration.

It is therefore an object of the present invention to provide methods and apparatus for decorating articles by an electrostatic offset plate process at rates of production and reliability corresponding to those of existing article forming machines.

It is another object of the invention to provide methods and apparatus for automatically applying image-shaped layers of printing powder particles to an offset plate and subsequently transferring the particles from the plate to an article.

It is another object of the invention to provide methods and apparatus for applying sharply defined images of printing powder particles to an offset plate for subsequent transfer to an article surface.

It is another object of the invention to provide methods and apparatus for automatically transferring images from a relatively flat offset plate to a surface of revolution.

It is another object of the invention to provide methods and apparatus for applying multi-color images of printing powder particles to an offset plate for subsequent transfer to an article surface.

Another object of the invention is to provide methods and apparatus for automatically transferring an image from an offset plate to non-cylindrical surfaces of revolution.

Other objects and features of the invention will become apparent by reference to the following specification and to the drawings.

In the drawings:
FIG. 1 is a schematic side elevational view of one form of apparatus embodying the invention;
FIG. 2 is a cross sectional view of the apparatus of FIG. 1 taken on line 2—2 of FIG. 1;
FIG. 3 is a detail cross sectional view taken on line 3—3 of FIG. 2;
FIG. 4 is a detail side elevation view, partially in section, taken approximately on line 4—4 of FIG. 2;
FIGS. 5, 6, 7, 8, 9 and 10 are schematic side elevational views, partially in section, showing the sequence of operations employed in applying a printing powder image to an offset plate and withdrawing the plate from the stencil screen;
FIG. 11 is a schematic side elevational view showing an offset plate of the structure of FIG. 1 approaching an image transfer station located adjacent an end sprocket;
FIG. 12 is a side elevational view similar to FIG. 11 showing the relationship between the offset plate assembly and article during the application of the image to the article;
FIG. 13 is a plan view of the apparatus in the position of FIG. 12, with certain parts broken away or omitted;
FIG. 14 is a top plan view, partially schematic, showing another embodiment of the invention;
FIG. 15 is a cross sectional view taken on line 15—15 of FIG. 14;

FIG. 16 is a detail view showing details of the track assembly of the structure of FIG. 14;

FIG. 17 is a detail cross sectional view showing the offset plate assembly during the image transfer operation;

FIG. 18 is a detail plan view of the structure of FIG. 17;

FIG. 19 is a side elevational view, partially schematic, generally similar to FIG. 12, showing still another modification of the invention;

FIG. 20 is a front elevational view of the offset plate and transfer assembly of FIG. 19;

FIG. 21 is a detail side elevational view, partially in section, of the transfer assembly of FIG. 19;

FIG. 22 is a detail front elevational view of the horizontal slide assembly of the structure of FIG. 19;

FIG. 23 is a detail front elevational view of the vertical slide assembly of the structure of FIG. 19;

FIG. 24 is a detail cross sectional view showing the engagement between the swing arm and offset plate assembly of the structure of FIG. 19;

FIG. 25 is a detail view, partially in section, showing details of the manner of mounting the offset plate assembly of the FIG. 19 structure upon the conveying chains;

FIGS. 26A and 26B are respectively top and front schematic views showing one stage of operation of the apparatus of FIG. 19; and FIGS. 27A through 31B are views similar to FIGS. 26A and 26B, showing subsequent stages of operation of the apparatus of FIG. 19.

Figure 6:
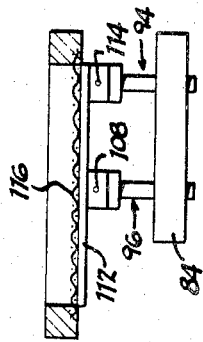

Referring first to FIGS. 1 through 3, there is shown in FIG. 1 a schematic side elevational view of one form of apparatus embodying the invention. The apparatus includes a pair of horizontal shafts 50 and 52 rotatably supported in a suitable stationary frame designated generally 54. Each of shafts 50 and 52 support a pair of spaced sprockets, such as 56 and 58, about which are operatively trained two endless chains 60. Supported upon and between chains 60, in a manner to be described in more detail below, are four offset plate assemblies designated generally 62, the plate assemblies being spaced at uniform intervals along chains 60.

Chains 60 are intermittently driven in movement by a drive motor 64 coupled, as by a chain and sprocket assembly designated generally 66 to shaft 50. The coupling 68 which couples drive motor 64 to shaft 50 includes a pair of alternately engaged one-revolution clutches which alternately couple motor 64 to shaft 50 or to a cam drive sprocket 70, coupled via chain 72 and sprocket 74 to a cam shaft 76 rotatably journaled in frame 54.

The intermittent driving motion applied to chains 60 advances the offset plate assemblies 62 along the endless path defined by chains 60 in uniform steps of movement having a length equal to the spacing of the respective plate assemblies 62 from each other upon the chains. In FIG. 1, the four assemblies 62 are shown at rest and upon the next actuation of chains 60, each carrier assembly 62 will be advanced along the path of chains 60 in a clockwise direction until it reaches the position previously occupied by the preceding assembly.

Above the mid-point of the upper run of chains 60 is located a powder application station at which a container 78 containing a supply of printing powder particles is located in vertically spaced relationship above the normal path of movement of plate assemblies 62.

At the right hand side of FIG. 1, a bottle conveyor designated generally 80 extends to successively advance bottles to be decorated into operative relationship with a plate assembly 62 disposed at a point midway in its path of travel about sprockets 58. It is at this location that a printing powder image is transferred from the offset plate to the bottle.

Below the midpoint of the lower run of chains 60 is disposed a plate cleaning station at which any untransferred residue of powder particles is cleaned from the plate assembly by a vacuum pump 82 located to be aligned with the plate assembly 62 at this position. The remaining rest position of a plate along the path of chains 60 is located midway of the path of travel of the assembly 62 about sprockets 56. This last position is an idle position and no operation is performed on the assembly 62.

Figure 4:
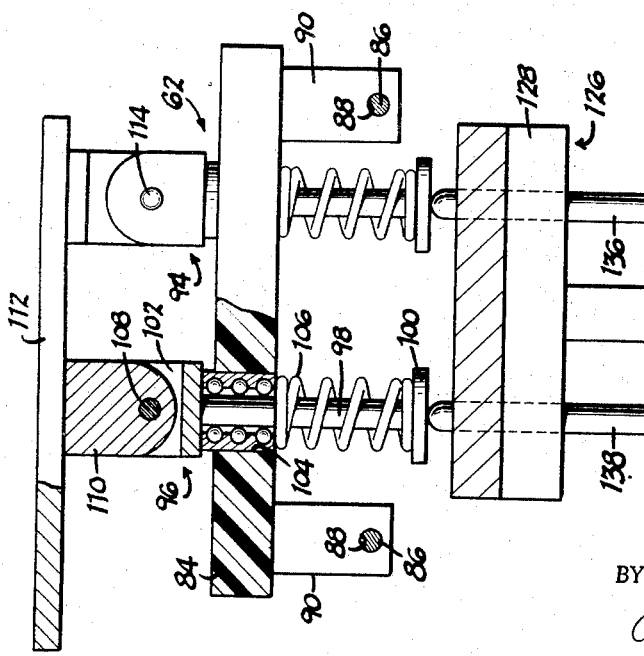

Structural details of assemblies 62 are best shown in FIGS. 2 and 4. Each assembly 62 includes a carrier plate 84 of electrically non-conductive material which is supported between chains 60 by a pair of rods 86 which pass through the chains to function as chain pins and also pass through bores 88 in legs 90 fixedly mounted on carrier plate 84. Plate 84 may be transversely located between the chains as by split rings 92 received upon rods 86.

A front support pin assembly 94 and a pair of rear support pin assemblies 96 are mounted in carrier plate 84. As is apparent from a comparison of FIGS. 2 and 4, front support pin assembly 94 is located midway of the extent of carrier plate 84 transversely of chains 60, while rear support pin assemblies 96 are disposed rearwardly of pin assembly 94 in symmetrical transversely spaced relationship. Apart from their location, each of support pin assemblies 94 and 96 are identical, and hence the detail cross section of the assembly 96 in FIG. 4 is equally applicable to the front support pin assembly.

As seen in FIG. 4, the assembly 96 includes a vertically elongate pin 98 having a head 100 at its lower end and fixedly secured at its upper end to a pivot yoke 102. Pin 98 is slidably received and guided for vertical movement relative to plate 84 by a ball bushing 104 whose outer race is fixedly mounted in plate 84. A compression spring 106 is disposed between head 100 of pin 98 and the lower end of bushing 104 to resiliently bias the pin downwardly within the bushing, the lower limit of movement of the pin within the bushing being established by the contact between the bottom of the yoke 102 and the upper end of bushing 104. A pivot pin 108 supported by yoke 102 passes through the depending central leg of a T-shaped bracket 110 which is fixedly secured to the under surface of a rectangular offset plate 112.

Front pin assembly 94 and the rear support pin assemblies 96 provide a three-point support for offset plate 112 upon carrier plate 84 which permits vertical movement of plate 112 relative to carrier plate 84 and which also permits pivotal movement of offset plate 112 relative to a plate 84 about two parallel horizontal axes established respectively by the pivot pin 114 of front pin assembly 94 and the two pivot pins 108 of the rear support pin assemblies 96, these last two pivot pins being axially aligned with each other. The purpose of accommodating the vertical translatory movement and the pivotal movement about the two horizontal axes is to prevent smearing of a powder image applied to the upper surface of offset plate 112 upon its withdrawal from a stencil screen through which the image is applied to the plate. Relative movement between carrier plate 84 and offset plate 112 is also utilized during the transferring of the image from plate 112 to the article being decorated in a manner to be described in detail in connection with FIGS. 11 through 13.

As best seen in FIG. 2, powder container 78 is constructed generally in the form of a box whose bottom is defined by a stencil screen 116 which usually takes the form of a relatively fine mesh steel wire screen covered with a coating which completely fills the openings in the screen mesh. Image defining apertures are formed through the coated screen by removing the coating from the screen in the desired areas. The procedures and materials employed are well known in the field, see, for example, United States Patent No. 3,100,150. A loose pile of colorant frit particles 118 may be conveniently supported upon the upper side of the screen, as a supply from which desired amounts of powder are periodically brushed across the image apertures of the screen, the frit particles being of a size such that they do not normally fall freely through the image apertures of the screen but can be expressed through the image apertures by the action of a reciprocating brush assembly 120 mounted to brush laterally back and forth across the upper side of the screen. The brush 120 may be slidably mounted upon a pair of guide rods 122 and reciprocated back and forth as by a suitably actuated pneumatic motor means 124.

As best seen in FIG. 2, the screen 116 is supported in spaced relationship above offset plate 112 when the plate 112 is at its normal lower position. To transfer the powder into an image defining layer upon the upper surface of plate 112, it is first necessary to elevate plate 112, until the upper surface of the plate is pressed into flat face-to-face contact with the under side of screen 116. This action is accomplished by a cam driven elevating pin assembly designated generally 126 which is mounted upon frame 54 beneath the path of movement of plate assemblies 62 and in vertical alignment with the stencil screen. The elevating pin assembly includes a fixed frame designated generally 128 having a front vertical bore 130 and a pair of rear vertical bores 132 which are located to be respectively aligned with front support pin assembly 94 and rear support pin assemblies 96 when the plate carrier assembly 62 is at the powder application station immediately beneath stencil screen 116. A front elevating pin 136 is slidably received in bore 130 and rear elevating pins 138 are received in the rearward bores 132. As best seen in FIG. 3, rear elevating pins 138 are fixedly mounted upon a T-shaped cam follower member 140 having a leg 142 which rests upon a rear support pin elevating cam 144 fixedly mounted upon cam shaft 76. Front elevating pin 136 is mounted upon a foot-like cam follower 146 which operatively rests upon a second or front support pin elevating cam 148 which is likewise fixedly mounted upon cam shaft 76. Rotation of cam shaft 76 causes front elevating pin 136 and rear elevating pins 138 to be elevated and lowered independently of each other in accordance with the configuration of their respective cams 144 and 148.

Figure 5:
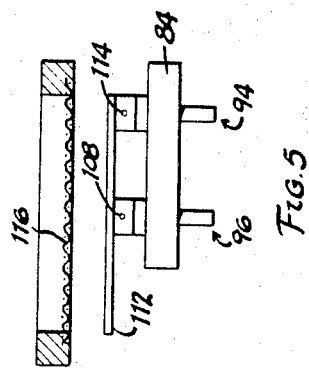
Figure 7:
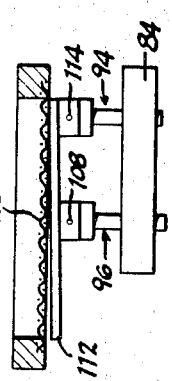
Figure 9:
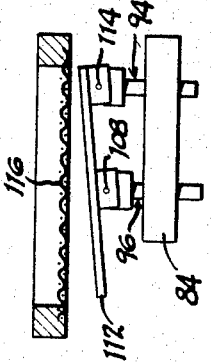

The sequence of shifting offset plate 112 into contact with screen 116 for application of the powder image and the subsequent restoral of plate 112 to its original normal lower limit of movement upon carrier plate 84 is shown in FIGS. 5–10, inclusive. In FIG. 5, the plate has arrived at the powder application station on chains 60 and is positioned in vertically spaced alignment below screen 116.

In FIG. 6, cam shaft 76 has been rotated to a position such that the elevating pin assembly 126 has elevated both of front and rear support pin assemblies 94 and 96 to their upper limit of movement at which plate 112 is in face-to-face contact with the lower surface of screen 116. Cams 144 and 148 are constructed to afford a substantial dwell to maintain plate 112 in the FIG. 6 position for a period of time sufficient to apply an image of printing powder particles to the plate by expressing the particles through the image apertures in screen 116 by action of brush 120.

After the powder image has been applied to plate 112, the rear support pin assemblies 96 are slowly lowered away from screen 116 while front support pin assembly 94 is maintained in its fully elevated position.

Figure 8:
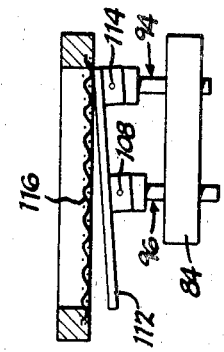

Lowering of rear support pin assemblies 96 is continued while front support pin assembly 94 is held stationary in its elevated position until, as seen in FIG. 8, substantially only the front edge of offset plate 112 remains in contact with screen 116. The necessary pivot action to permit the tilting of plate 112 in this manner is accommodated by the pivotal connections at 108 on the rear support pin assemblies and 114 on front support pin assembly 94. The pivoting action of the plate away from screen 116 assures that the powder image on the plate does not become smeared as it is withdrawn from screen 116. Because the plate is held in face-to-face contact with the screen during the application of the powder image, the powder image projects upwardly slightly above the surface of plate 112 and any flexing or distortion of the screen occasioned by the pressure of the plate against the screen exerts a slight smearing action on the powder image if direct withdrawal is attempted. By swinging the plate away from the screen in the manner just described, the possibility of smearing is minimized and the desired sharpness of image is maintained. This swinging movement of the plate on withdrawal minimizes aerodynamic movement of powder affecting the sharpness of the formed image. In contrast, a direct withdrawal of the plate straight away from the screen creates aerodynamic movement of powder particles from within the screen apertures at the end of the image formation step, and these particles are deposited on the plate by aerodynamic action to cause scattering or fuzziness of the image.

Figure 10:
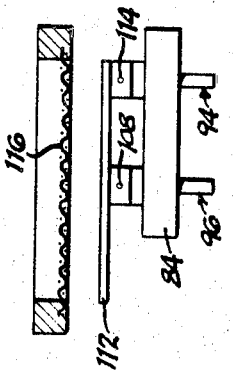

In the FIG. 8 position, both support pin assemblies 94 and 96 are being lowered concurrently to restore the plate to its original normal lowered position in FIG. 10.

After a powder image has been applied to offset plate 112 by the procedure described above, the assembly 62 is advanced from the powder application station beneath container 78 into the printing position midway of the path of travel of assembly 62 about end sprockets 58. Manipulation of plate 112 as it moves into the printing position is best shown in FIGS. 11–13, inclusive.

In FIG. 11, the plate assembly 62 is approaching end sprockets 58 with offset plate 112 at its lower limit of movement relative to carrier plate 84 by virtue of the biasing action of the springs on front support pin assembly 94 and rear support pin assemblies 96. A front support pin manipulating arm 150 is fixedly mounted upon shaft 52 which carries end sprockets 58, and a pair of rear support pin manipulating arms 152 are likewise fixedly mounted upon shaft 52 at positions angularly aligned with each other and angularly displaced from the front pin manipulating arm 150. At its outer end, arm 150 slidably receives a front manipulating pin 154 having heads 156 and 158 at its opposite ends. A compression spring 160 is seated between a boss 162 at the outer end of arm 150 and head 156 to normally bias pin 154 to an extended position determined by the engagement of head 158 with the opposite side of boss 162. Pin 154 is slidably received within a bore (not shown) through boss 162.

Each of rear support pin manipulating arms 152 likewise carry a pin 162. Pin 162 consists of a threaded bolt having a head 164 of the same configuration as head 156, and the bolt being threaded into a tapped bore in a boss 166 at the outer end of each arm 152 and held at a selected adjusted position by a lock nut 168.

As best seen in FIGS. 12 and 13, head 156 of the front manipulating pin 154 is located to contact front support pin assembly 194, while the heads 164 of the rear manipulating pins are located to contact the rear support pin assemblies 96 as the plate assembly 62 is driven about end sprockets 58.

As stated above, chains 60 are driven in a fashion such that during each intermittent step of advancement of the chains, an assembly 62 is carried from operative relationship with stencil screen 116 into the printing position shown in FIG. 12. As the assembly 62 moves into the position of FIG. 12, the manipulating pins engage the support pin assemblies 94 and 96 of plate assembly 62 and shift the support pin assemblies against the action of their springs so that plate 112 is moved outwardly away from carrier plate 84 into operative alignment with a path of travel of bottles to be decorated along bottle conveyor 80.

Bottle conveyor 80 includes a plurality of bottle supporting platforms 170 which are mounted for rotation upon conveyor 80 by suitable bearings indicated at 172, the bearings being driven along the conveyor in a direction towards the observer in FIG. 12. Platforms 170 are freely rotable and as the platform is carried past plate 112, a stationary rub bar 174 supported on frame 54 frictionally engages the periphery of platform 170 to cause the platform to roll along the rub bar 174 as the platform is advanced from right to left as viewed in FIG. 13. Rotation of platform 170 causes the surface of the bottle B being printed to roll laterally across the surface of offset plate 112.

Transfer of the powder image from offset plate 112 to the surface of bottle B is accomplished by electrically charging the plate and bottle from a high voltage source V, schematically illustrated in FIG. 12, having one terminal connected, as by brush means 176, to shaft 52, and hence through the metallic manipulating pins and support pin assemblies to plate 112. The opposite terminal of voltage source V is electrically connected as by an elongate brush 178, coextensive with rub bar 174, to the side of bottle B to electrically connect voltage source V to the bottle as the bottle is rolled across the surface of plate 112. Shaft 52 is electrically insulated from sprockets 58, and preferably the electrical supply lines S to voltage source V are controlled by a limit switch 180 which may be mounted on rub bar 174 to be closed when plate assembly 62 is in the printing position.

The electrostatic transfer of the image to the plate is accomplished in a well known manner by electrically charging the printing powder particles by virtue of their contact with plate 112 and attracting the electrically charged particles to the oppositely charged surface of the bottle B.

During the transfer of the powder image from offset plate 112 to the surface of the bottle B, the next succeeding plate is having an image applied to it through stencil screen 116.

At the conclusion of the printing operation, the next step of movement of chains 60 carries the plate assembly 62 from the printing position of FIG. 12 into operative registry with the cleaning apparatus 82 (FIG. 1). The cleaning apparatus 82 applies a vacuum to clean any residue of powder from the offset plate.

To summarize the operation of the embodiment of FIGS. 1 through 13, chains 60 are intermittenly driven in uniform steps of movement so that each of four plate assemblies 62 is driven one-quarter of the distance around the path of movement of the chains during each step of movement. Between successive steps of movement of the chains, cam shaft 76 is driven to manipulate the offset plate at the image application station through the sequence of movement shown in FIGS. 5 through 10, inclusive. Each plate is successively advanced from the idle position half way around drive sprockets 56 to the image application station below powder container 78, thence to the printing position one-half way around sprockets 58 in operative registry with bottle B, thence to the plate cleaning station at vacuum pump 82, and are then returned to the idle position one-half way around sprockets 56. Operation of bottle conveyor 80 is of course synchronized with movement of plate assemblies 62 to the printing position. The intermittent movement of chains 60 may be conveniently related with operation of cam shaft 76 between successive steps of movement of the chains by alternately connecting drive motor 64 to drive chains 60 or to drive cam shaft 76 by a pair of alternately engaged one revolution clutches.

A modified form of the invention is disclosed in FIGS. 14 through 18, inclusive. Referring first to FIG. 14, a pair of end sprockets 200 and 202 are mounted upon rotary shafts 204 and 206, respectively, for rotation about vertical axes. A single chain 208 is operatively trained about sprockets 200 and 202 for movement in a horizontal plane and supports a plurality of offset plate assemblies 210 for movement along the endless path defined by chain 208.

As is apparent from FIG. 14, plate assemblies 210 are closely spaced along chain 208 and the FIG. 14 through 18 embodiment is provided with three powder application stations PA1, PA2 and PA3, instead of a single powder application station of the previously described embodiment. The apparatus of FIG. 14 is more flexible than that of the first described embodiment in that it may be employed to print multi-color decorations upon bottles or other articles, or can be operated to simultaneously print a plurality of bottles with a single color decoration. While three powder application stations have been shown in FIG. 14, it will be apparent that this number can be increased or decreased as desired. With three powder application stations, the apparatus may be employed to print a three color decoration on a single bottle for each step of movement of chains 208, or alternatively, may be employed to simultaneously print three bottles for each step of movement of chain 208. By providing four powder application stations 212, a single four color decoration could be applied in one step or, alternatively, two two-color decorations could be applied in a single step, or four single color decorations could be applied in a single step.

As in the previously described embodiment, chain 208 is driven in intermittent movement with a step of advancement of a length dependent on the mode of operation. Where a single bottle is printed for each step, the length of the step of advancement is equal to the spacing between successive plate assemblies 210, so that on each step of movement, each plate is advanced into the position previously occupied by the preceding plate. When three bottles are being printed simultaneously, the step advancement is three times as great.

Referring to FIGS. 15 through 18, plate assemblies 210 differ from the plate assemblies 62 of the previously described embodiment primarily in the manner in which they are mounted upon chain 208. As in the previous case, each plate assembly 210 includes a carrier plate 212 and front and rear support pin assemblies 214 and 216 of the same construction as those of plate assemblies 62. As in the previous case, an offset plate 218 is cooperatively supported upon the support pin assemblies and the support pin assemblies include compression springs 220 and 222, respectively, which bias plate 218 toward carrier plate 212. Each plate assembly 210 is supported from chain 208 by a pair of brackets 224, one at each end of the plate 212, which are supported by pivot pins 226 carried by a curved stud 228 mounted upon chain 208. Pivot pins 226 support plate assembly 210 for pivotal movement about a horizontal axis defined by the aligned pins 226 between a position wherein offset plate 218 is in a vertical plane, as on FIG. 17, and a position wherein plate 218 is in a horizontal plane, as in FIG. 15.

Plate assembly 210 is positioned about the pivotal axis defined by the pair of pins 226 by a rod 230 fixedly secured at one end to the plate and having a roller 232 in the form of a ball bearing rotatably mounted at its outer end. Roller 232 is received within a guide track 234 of U-shaped transverse cross section which is fixedly supported by frame means, not shown, to extend along the path of travel of chain 208 in a relationship to the chain which achieves the desired pivotal position of plate assembly 210 at various locations along the chain path. Referring to FIG. 14, along the run of chain 208 which extends beneath powder application stations 212, track 234 extends horizontally along the chain, since it is desired to have plate assembly 210 in a horizontal position during the application of powder thereto from application stations 212. The relationship of track 234 to chain 208, and the plate assembly 210 along this portion of the path of travel, is shown in cross section in FIG. 15.

Along the opposite run of chain 208 wherein plate assemblies 210 pass along in adjacency to bottle conveyor 236, it is desired to have the plate assembly with offset plate 218 in the vertical plane as shown in FIG. 17. Along this run of the chain, as best seen in FIG. 17, track 234 is located below the level of chain 208 to pivot the plate assembly into the desired vertical position. As is apparent from a comparison of FIGS. 15 and 17, track 234 extends along at a level somewhat above that of chain 208 along its powder application run, while track 234 is disposed somewhat below the level of chain 208 in an upwardly open position along the opposite or image transfer run of chain 208. Track 234 is bent gradually from the horizontally facing position of FIG. 15 to the vertically facing position of FIG. 17, as the track passes around the corner defined by sprocket 202 and is gradually bent back upwardly as the track passes along that portion of the run of chain 208 where the chain is leaving the opposite sprocket 200. The plate is maintained in a substantially vertical position during most of its transit around sprocket 200 for convenience in a cleaning station defined by a rotatable brush assembly 238 located to brush any residue of powder from the plate as the plate passes around sprocket 200. Brush assembly 238 is operable to clean the plates whether the plates are actually stopped at the cleaning station, as would be the case in a single image transfer per cycle of movement of the chain, or whether several plates are advanced past the cleaning station, as would be the case in a multiple bottle printing operation.

As in the embodiment of FIGS. 1 through 13, each powder application station 212 includes a box-like powder container 240 whose bottom is defined by a stencil screen 242 of the same type as screen 116 of the previous embodiment. A brush assembly 244 is driven in reciprocation by a pneumatic motor 246 to express powder particles through the image aperture of the screen onto the upper surface of plate 218 when the plate is disposed in the elevated powder receiving position shown in FIG. 15. A cam actuated elevating assembly designated generally 248 is employed to elevate plate 218, the structure and method of operation of elevating assembly 248 being precisely similar to that of the analogous structure 126 of the FIGS. 1 through 13 embodiment.

Referring to FIGS. 17 and 18, at the location at which the image is transferred from the plate to the bottle, a cam driven pusher assembly designated generally 250 is employed to push plate 218 a slight distance outwardly from carrier plate 212 into operative alignment with the path of movement of bottles along bottle conveyor 236. Assembly 250 includes a plate 252 mounted for sliding movement along a plurality of posts 254 fixedly mounted upon the machine frame indicated partially at 256 in FIG. 18. Plate 252 carries a pair of pins 258 respectively aligned with rear support pin assemblies 222, and a spring-loaded pin assembly 260 located upon plate 252 to be aligned with front support pin assembly 220. A rotary cam shaft 262 carries a cam 264 which bears against the rear of plate 252 and is operable to drive the plate outwardly to the position shown in FIGS. 17 and 18 when the long radius portion of the cam is engaged with plate 252. A pair of tension springs 266 coupled between plate 252 and frame 256 resiliently draw the plate 252 against cam 264 to retract the plate when the short radius portion of cam 264 is in contact with plate 252.

Referring now to FIG. 14, cam shaft 262 carries three cams 264, one cam being operatively aligned with one of three plate assemblies 210, respectively located at printing stations identified generally as PS1, PS2 and PS3. The three cams 264 are angularly aligned with each other upon shaft 262, so that upon rotation of shaft 262, as by a suitable drive means indicated schematically at 268, the offset plates 218 of the plate assemblies located at the three printing stations PS1, PS2 and PS3 will simultaneously be projected into operative printing relationship with bottles B being conveyed on bottle conveyor 236.

When the apparatus of FIG. 14 is employed to print single colored decorations on bottles passing along bottle conveyor 236, each of powder application stations PA1, PA2 and PA3 are supplied with powder of the same color, and a complete image is applied to each of three plates simultaneously. The length of advancement of chain 208 in a clockwise direction, as viewed in FIG. 14, is selected to be equal to three plate positions upon the chain, so that the three plates with the applied powder image are carried clear of the powder application stations, and the next succeeding three plates are operatively positioned beneath the respective stations at the conclusion of the next step of advancement. On the third step of advancement after the application of the powder image to a group of three plates at powder application stations PA1, PA2 and PA3, the three plates arrive at printing stations PS1, PS2 and PS3 where they are simultaneously projected out into operative alignment with the path of travel of bottles being decorated along conveyor 236. Conveyor 236, like that of the previously described embodiment, includes a plurality of freely rotatable bottle supporting platforms, such as 270, and a rub bar and electrostatic transfer mechanism similar to that of the previously described embodiments is employed to rotate the bottles in rolling relationship across the surfaces of plates 218 to simultaneously transfer the powder image from the plates to the bottles. The speed of movement of conveyor 236 is obviously related to and synchronized with that of chain 208.

When the apparatus of FIG. 14 is employed to apply a three color decoration to a bottle, the cams 264 associated with printing stations PS2 and PS3 are uncoupled from shaft 262 as by a shaft coupling 272, so that only the cam 264 associated with printing station PS1 is operable to project an offset plate into operative relationship with a bottle travelling along conveyor 236.

In the multi-color printing operation, each of powder application stations PA1, PA2 and PA3 contains a frit or powder of a different color, and the length of advancement of chain 208 in each step of forward movement is regulated to be equal to the spacing between successive plate assemblies 210 upon the chain, so that each plate is advanced successively into operative relationship with powder application station PA1, and to powder application station PA2, and then to powder application station PA3.

Thus, assuming a decoration having red, white and blue coloring, the red powder might be contained at station PA1, the white powder at station PA2, and the blue powder at station PA3. A clean plate advanced into operative relationship with station PA1 during one step of movement would have the red powder portion of the image applied, would then be advanced to the next station on the next successive movement of chain 208, have the white portion of the image applied and, during the next cycle of movement of chain 208, would be advanced to station PA3 for application of the blue portion of the image. The plate, with the three-color powder image applied to offset plate 218, would then be advanced in step-by-step movement, clockwise along the path of chain 208, until the plate arrived at printing station PS1. Operation of cam 264 would then project the plate into operative relationship with a bottle on conveyor 236, and the image would then be electrically transferred to the bottle.

Comparing the rate of production of the apparatus of FIG. 14 with that of FIGS. 1 through 13, it will be noted that the limiting factor in both cases is the time required to apply a powder image to the offset plate. Because of this limiting factor, the apparatus of FIG. 14 is operable to print three color images on bottles at substantially the same rate as the embodiment of FIGS. 1 through 13 is operable to print single color images. A three-fold increase in production in the printing of single color images is possible with the embodiment of FIG. 14 over the production rate of that of FIGS. 1 through 13.

Still another embodiment of the invention is disclosed in FIGS. 19 through 31. The embodiment of FIGS. 19 through 31 is, in effect, a modification of the embodiment of FIGS. 1 through 13, in that a dual chain conveyor is employed, the powder image is transferred to the offset plate while the plate is in a horizontal position on the upper run of the chains, and the image is transferred while the plate is at a position half-way around one set of end sprockets. The basic distinction between the embodiment of FIGS. 19 through 31 and that of FIGS. 1 through 13 is the manner in which the plate is manipulated during the application of the image to the article. Manipulation of the plate during the image applying step in the embodiment of FIGS. 19 through 31 requires that the plate assembly be physically removed from the conveying chains and thus, in addition to the plate manipulating mechanism, the plate assembly is provided with a detachable mounting to the conveying chains rather than the permanent type mounting employed in FIGS. 1 through 13.

With these exceptions, the chain conveyor structure of FIGS. 19 through 31 is substantially similar to that of FIGS. 1 through 13, and hence is not described in detail. Primed reference numerals in FIGS. 19 through 31 designate parts corresponding to those described in detail in connection with FIGS. 1 through 13.

Referring briefly to FIG. 2, in that embodiment of the invention, an offset plate assembly 62 includes a carrier plate 84 which is supported from chain 60 by means of rods 86 extending transversely between the chain and received within brackets 90 fixedly mounted upon a carrier plate 84 of plate assembly 62. The offset plate itself, 112, is in turn supported upon carrier plate 84 for vertical movement relative to the plate by front and rear support assemblies designated generally 94 and 96.

Referring now to FIG. 25, a modified form of offset plate assembly 62' includes a carrier plate 84' which is detachably mounted upon chain 60' by means of an auxiliary carrier plate 280 having integral brackets 282 mounted upon rods 86' which are supported upon and extend transversely between chains 60' in the same fashion as rods 86 of FIG. 2.

As seen in FIG. 24, an offset plate 112' is supported from carrier plate 84' by front and rear support pin assemblies 94' and 96' in precisely the same manner as offset plate 112 is supported upon carrier plate 84 in FIG. 2.

Returning to FIG. 25, auxiliary carrier plate 280 is provided with a series of bores such as 284 which are located to provide the indicated clearance for the downwardly projecting support pin 100' and spring 98' of the front and rear support pin assemblies 94' and 96'. As will be recalled from the description of the FIG. 1 through 13 embodiment, carrier plate 84 was of rectangular configuration, and carrier plate 84' of the FIGS. 19 through 31 embodiment is likewise of rectangular shape in plan view. Plate 84' is supported upon auxiliary carrier plate 280 near each corner by a hardened pin 286 which is grooved near its upper end as at 288 to form one element of a first detent assembly designated generally 290 which includes spring loaded ball assemblies 292 which seat in groove 288 of pin 286 to detachably couple plate 84' to auxiliary carrier plate 280.

Adjacent each corner of carrier plate 84' is a second detent assembly designated generally 294 which is employed to couple carrier plate assembly 62' to the transfer mechanism to be described below. As will be noted from FIG. 25, detent assemblies 294 are offset outwardly from chain 60' to afford operating clearance for elements of the transfer assembly designated generally 296.

The structural details of the transfer assembly are shown in FIGS. 19 through 23, inclusive. Referring first to FIGS. 19 through 21, transfer assembly 296 is located below and adjacent to end sprockets 52' of the plate conveyor. The purpose of transfer assembly 296 is to remove a plate assembly 62' from chains 60' at the image transfer station located one-half of the distance of travel of chains 60' about sprockets 52' and to transfer the plate assembly 62' into operative relationship with an article A supported upon an article conveyor designated generally 298.

Assembly 296 is formed with a frame 300 upon which is fixedly secured a pair of parallel horizontal slide rods 302 which in turn are each supported for horizontal sliding movement in a pair of fixedly mounted ball bushing supports 304. Transfer assembly 296 is driven in horizontal reciprocatory movement from left to right and vice versa, as viewed in FIGS. 19 and 21, by a suitable pneumatic motor 306 whose cylinder is fixedly mounted upon the machine frame and whose piston rod is coupled to frame 300.

Referring now particularly to FIGS. 21 and 22, at the rear or left hand end of frame 300 is disposed a horizontal slide assembly which includes an open rectangular frame 308 fixed to frame 300 within which is fixedly mounted a pair of horizontal slide rods 310 which are secured to and extend between the vertical elements of frame 308. A generally rectangular slide block 312 is slidably mounted upon rods 310 for horizontal sliding movement from left to right as viewed in FIG. 22. Horizontal slide block 312 carries a pair of ball bearings 314 within a centrally located horizontal bore extending through block 312. At the rear side of slide block 312, a horizontal gear rack 316 is fixed to slide block 312 and meshes with a pinion gear 318 of a hydraulic motor 320 carried upon a bracket 322 fixedly secured to the rear side of frame 308. Motor 320 is a reversible motor and it is believed apparent that upon driving of motor 320, its pinion 318 meshing with rack 316 on slide block 312 will drive the slide block horizontally along rods 310 in a direction dependent upon the direction of rotation of motor 320.

Horizontal slide block 312 supports, by means of bearings 314, a vertical slide assembly designated generally 324 having a rod 326 rotatably supported in bearings 314 for rotation about the horizontal axis established by the bearings. Rod 326 is fixedly secured, as by welding, to a bracket 328 which supports a rigid open rectangular frame 330 (FIG. 23) in which a pair of vertically extending slide rods 332 are fixedly mounted to extend vertically across the opening between the horizontal portions of frame 330.

A swing arm assembly designated generally 334 is slidably supported upon rods 332 as by ball bushings 336 (FIG. 21) slidably mounted upon rods 332.

Swing arm assembly 334 includes a lower generally rectangular plate 338 having upwardly projecting and forwardly curved arms 340 at each side of the plate. Ball bushings 336 are mounted upon the rear side of plate 338 as by brackets 342 fixedly secured to plate 338. At their upper ends, arms 340 are formed with enlarged inwardly projecting ears 344 upon each of which is mounted a pair of carrier plate engaging pins 346 and 348 best seen in FIG. 24. The pins are so located upon ears 344 as to be engageable with detent assemblies 294 on carrier plate 84'.

The length of horizontal travel of transfer assembly 296 is such that when a plate assembly 62' is located on conveyor chains 60' at the transfer position half-way around sprockets 52', pins 346 and 348 are spaced rearwardly from carrier plate 84' in alignment with detent assemblies 294. Upon forward movement of transfer assembly 296, i.e., rightward movement as viewed in FIGS. 19 and 21, pins 346 and 348 enter the detents 294 and carrier plate 84', and upon further forward movement of transfer assembly 296, carrier plate 84' is detached from pins 286 on auxiliary carrier plate 280 for movement clear of the conveyor into operative registry with an article A to be printed as shown in FIG. 19.

Because this particular apparatus is employed frequently to decorate the side surfaces of tapered articles, such as the article A shown in FIG. 19, it is desirable to have the surface of plate 112' somewhat inclined and thus the lower pins 348 upon the swing arm assembly are adjustable by cutting an external thread on the pin and threading the pin into a tapped bore 350 in ear 344. A lock nut 352 may be employed to secure the adjustment.

At the forward end of frame 300, a cam plate 354 is fixedly secured. Cam plate 354 is formed with an arcuate cam slot 356 within which are disposed two cam follower rollers 358 rotatably mounted upon stub shafts 360 fixedly mounted in the front of plate 338.

A rub bar 362 is mounted upon swing arm assembly 334 for purposes to be described below. It is desirable that the rub bar be capable of vertical adjustment upon the swing arm assembly, and accordingly, a suitable rub bar adjustment mechanism 364 supports the rub bar upon the arms 340 of the swing arm assembly. The structure of the adjustment 364 may take various forms as, for example, by securing each end of the rub bar to a nut threaded upon a vertically disposed screw so that rotation of the screw will raise or lower the rub bar.

The function of rub bar 362 is the same as that of rub bar 174 of the FIGS. 1 through 13 embodiment. Article conveyor 298 includes a rotary article supporting chuck 364 (FIG. 19) which is engaged by rub bar 362 and driven in rotation by movement of the rub bar upon operative movement of the swing arm assembly.

Before describing the overall operation of transfer assembly 296, the movement of the various parts of the assembly will be briefly reviewed. As described above, the assembly as a whole is supported for horizontal movement by slide rods 302 between the operative position illustrated in FIG. 19 and a rest position wherein the upper portion of swing arm assembly 334 is disposed in the dotted line position of FIG. 19. In addition to the horizontal translatory movement of the assembly guided by the sliding engagement of slide rods 302 in bearing assemblies 304 and driven by actuation of the pneumatic motor 306, swing arm assembly 334 is also capable of pivotal movement about a horizontal axis parallel to the longitudinal extent of guide rods 302 and located at the center of the circular arc defined by cam slot 356 (FIG. 20). Swing arm assembly 334 is constrained by the engagement of follower rollers 358 in cam slot 356 to pivot about the axis established by the circular configuration of the cam slot.

Pivotal movement of swing arm assembly 334 is initiated by action of hydraulic motor 320 which, when actuated, drives its pinion 318. Pinion 318 in turn drives gear rack 316 which is fixed upon the horizontal slide block 312 which causes this slide block to move horizontally along the path established by horizontal guide rods 310. Horizontal movement of slide block 312 along rods 310 carries with it bearings 314 which in turn constrain rod 326 of the vertical slide assembly to move horizontally with the slide block. Thus, as horizontal slide block 312 is moved along rods 310, vertical slide assembly 324 must move with horizontal slide bar 312. Horizontal movement of the vertical slide assembly carries with it swing arm assembly 334, and the engagement of cam follower rollers 358 in cam slot 356 requires the slide assembly to pivot about the axis of the circular arc defined by cam slot 356. The pivotal support of vertical slide assembly 324 defined by its support rod 326 permits the vertical slide assembly to pivot as required by the curvature of cam slot 356 while the sliding engagement of swing arm assembly 334 upon the rods 332 of the vertical slide assembly allows the necessary vertical component of movement between swing arm assembly 334 and vertical slide assembly 324.

With the exception of the operation of transfer assembly 296, the overall operation of the embodiment of FIGS. 19 through 31 is quite similar to that of the embodiments of FIGS. 1 through 13, insofar as the applying of the image to offset plate 112′ and the intermittent operation of conveyor chains 60′ is concerned. As in the FIGS. 1 through 13 embodiment, the image is applied to plate 112′ in the same fashion as illustrated in FIGS. 2 and 5 through 10, inclusive. Intermittent advancing operation of conveying chains 60′ advances plate assembly 62′ to the transfer position partially indicated by the dotted line illustration of plate 84′ in FIG. 19. When the plate assembly arrives in this latter position, swing arm assembly 334 is disposed at its extreme lefthand movement of travel indicated at broken lines in FIG. 19. When in this position, pins 346 and 348 of swing arm assembly 334 are aligned with corresponding detent recesses 294 of plate 84′. Pneumatic motor 306 is then actuated to drive the transfer assembly 296 to the right, as viewed in FIG. 19, and during the initial stage of the advancing movement of the assembly, pins 346 and 348 of transfer assembly 296 enter the corresponding detents 394 and plate 84′ to pick the plate assembly off the conveying chains 60′ to carry it into operative relationship with the article A on conveyor 298.

The sequence of movements of the swing arm assembly and article conveyor 298 are shown in step-by-step fashion in FIGS. 26A through FIG. 31B of the drawings.

Referring first to FIG. 26A and FIG. 26B, which are respectively top plan and front views of the swing arm assembly and bottle conveyor, plate assembly 334 is shown just after it has picked plate assembly 62′ from the chains 60′ of the conveyor. The arrow P in this group of figures shows the direction in which transfer assembly 296 is moving as a whole, while the arrow C shows that direction in which the article A is moving. The arrow S indicates the direction of pivotal movement of the swing arm assembly. In FIGS. 26A and 26B, the plate assembly is moving out toward the path of movement of the article A which is likewise moving toward the position at which the image will be transferred.

Referring now to FIGS. 27A and 27B, the assembly is shown at a slightly later state of the cycle. In this stage, the transfer assembly is still moving outwardly toward the article conveyor, while the article is approaching the decorating position. In addition to the horizontal outward movement of the transfer assembly, in FIGS. 27A and 27B, swing arm assembly 334 is being pivoted in a clockwise direction as indicated by arrow S.

In FIGS. 28A and 28B, the assembly is shown in the position which the various elements assume just prior to the start of the actual transfer of the image. At this time, article conveyor 298 has halted with the article in its image transferring position. Swing arm assembly 334 is at its extreme righthand or clockwise end of pivotal movement, as indicated by the engagement of th righthand cam follower roller 358 at the extreme righthand end limit of cam track 356. The image to be printed is offset so that the point of tangential engagement between the front surface of offset plate 112′ and the article is disposed slightly to the left of the extreme lefthand end of the image. Plate 112 may be either in contact with the side of the article or slightly spaced from the side of the article in those cases where an electrostatic transfer of the powder from the plate to the article surface is employed.

Referring now to FIGS. 29A and 29B, swing arm assembly 334 has been swung aproximately half-way through its path of pivotal movement defined by cam slot 356 and is swinging in a counterclockwise direction. The engagement between rub bar 362 and the article supporting chuck 364 is driving the article in counterclockwise rotation as viewed in FIG. 29A, so that the article is in effect rolling with no slip across the face of offset plate 112′.

The counterclockwise pivotal movement of swing arm assembly 334 is continued from the FIG. 29B position to the FIG. 30B position, at which time the article has completely traversed the image carried by plate 112′. Transfer of the image from plate 112′ to the article has been completed at the FIGS. 30A and 30B stage.

Upon the completion of the transfer of the image, pneumatic motor 306 is driven in reverse movement to retract the transfer assembly back toward the chain conveyor.

Shortly after the start of the retracting movement, hydraulic motor 320 is actuated to swing swing arm assembly 334 back to its normal rest or vertical position, assembly 334 arriving in this position before the transfer assembly reaches chain 60'. As the transfer assembly moves to its final completely retracted position, pins 286 on auxiliary carrier plate 280 enter their detents 290 and support of plate assembly 62' is restored to chains 60'.

The embodiment of FIGS. 19 through 31 is particularly adapted for decorating surfaces of revolution which are not truly cylindrical. A typically encountered surface of this type is presented by tumblers having tapered sides where the side surface of such a tumbler is a frusto-conical surface. In the case of frusto-conical surfaces which are to be printed from a flat offset plate, the true development of the desired image on a flat surface finds horizontal image lines lying along concentric circular arcs drawn about radii from the imaginary apex of the frusto-conical surface with vertical image lines extending radially, rather than parallel to each other.

The radius of curvature of cam slot 356 is thus calculated to be drawn about a center which would intersect the apex of the frusto-conical surface of the article being decorated when the article was located in the decorating position of FIG. 28B.

The shape of the layer of printing powder particles as applied to offset plate 112' is in the form of a development of the appearance of the desired final image on the frusto-conical surface of the article.

Referring to FIG. 30B, the center of curvature of cam slot 356, and the center about which the development of the image is made, is located at the imaginary apex of the frusto-conical surface of the article, designated in FIG. 30B as "Apex." The axis about which swing arm assembly 334 is rotated is a horizontal axis perpendicular to the plane of the paper and passing through the point "Apex" of FIG. 30B. A minor approximation is introduced by making the axis of rotation of swing arm assembly 334 horizontal rather than truly perpendicular to the tapered surface of the article, but this approximation is counterbalanced to some extent by the inclined mounting of plate 112' upon the swing arm assembly.

The side of chuck 364 engaged by rub bar 362 is preferably tapered to the same degree as the side surface of the article, the tapered side surface of the chuck affording an adjustment of the rotative speed of the article to achieve a no-slip rolling motion between the article surface and image.

In those cases where the article surface is doubly curved, an offset plate which is flexible or resilient may be employed and an approximate "Apex" may be calculated.

Because of the manner in which swing arm assembly 334 is supported for horizontal, pivotal and vertical movement relative to frame 300, the image transferring stroke of the swing arm assembly is entirely dependent upon the configuration of cam slot 356. Thus, the path of swinging movement of swing arm assembly can be changed merely by replacing cam plate 354 with a new cam plate having a cam slot curved to establish the desired path.

While various embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

I claim:

1. In an offset plate decorating process wherein an image-shaped layer of printing powder particles is applied to the surface of an offset plate held in face-to-face engagement with the lower side of a horizontal stencil screen by expressing printing powder particles downwardly through image-defining apertures in the screen while the plate is held in engagement therewith; the improvement comprising the steps of supporting said plate for pivotal movement about two parallel horizontal axes on said plate, a first of said axes extending in adjacent relationship to one edge of said plate and the second of said axes being disposed between the first axis and the edge of the plate opposite said one edge, engaging the plate with the screen by elevating both axes until the plate is in face-to-face engagement with the lower side of the screen, withdrawing the plate from the screen after the application of the layer of particles thereto by pivoting the plate downwardly about the first axis until the layer of particles applied to the plate has been disengaged from the screen, and subsequently lowering the first axis to pivot the plate about the second axis parallel to the first axis until the plate is restored to a horizontal position in spaced relationship from the screen.

2. In an offset plate decorating process wherein an image-shaped layer of printing powder particles is applied to the surface of a flat offset plate held in face-to-face engagement with one side of a stencil screen by expressing printing powder particles through image-defining apertures in the screen while the plate is held in face-to-face engagement therewith; the improvement comprising the steps of supporting the stencil screen in a horizontal position, advancing an offset plate along a first path extending beneath said screen until the plate is located in vertically spaced registry beneath the image apertures of the screen, elevating the plate from said first path into face-to-face engagement with the underside of said screen, applying the layer of powder particles to the plate while the plate is held in engagement with the screen, pivoting the plate about a first horizontal axis until the image-shaped layer of particles applied to the plate has been disengaged from the screen, and subsequently pivoting the plate about a second horizontal axis parallel to the first axis until the plate is restored to a horizontal position on said first path.

3. In an offset plate decorating process as defined in claim 2, the further steps of subsequently advancing the plate with the image-shaped layer of particles thereon away from registry beneath said screen into a vertical position at a second location on said first path, advancing an article to be decorated into spaced registry with the plate while the plate is at said second location on said path, projecting the plate horizontally from said first path into juxtaposition with the registered article and transferring the layer of printing powder from the plate to the article, returning the plate to said second location, and subsequently returning the plate to said first location.

4. In an offset decorating process as defined in claim 3, the further steps of disposing a series of said offset plates in uniformly spaced relationship to each other for movement along said first path with the spacing between the plates corresponding to the distance between the first and second locations on the path, and intermittently advancing the group of plates as a unit in uniform steps of movement along said first path, the length of each step of advancement corresponding to the distance between said first and said second location whereby an image-shaped layer of particles may be applied to one of said plates at said first location while an image-shaped layer of particles is being transferred from the preceding plate to an article at said second location.

5. In a method of decorating a curved side surface of a bottle, tumbler or similar article having a vertical axis of symmetry by electrically transferring an image-shaped layer of powder particles from an offset plate to the article surface; the steps of conveying an offset plate along an endless first path to a first location at which said plate is located in spaced vertical registry beneath a stencil screen having image-defining apertures therein, elevating the plate from said first location into engagement with the screen and expressing powder particles through the image apertures of the screen to apply an image-shaped layer of powder particles to the surface of the plate, returning the plate to said first location and then conveying the plate along said first path to a second location on said first path, locating an article to be decorated at a decorating position in spaced registry with said plate at said second location, advancing the plate from said second location into juxtaposition with the article, rotating the article about its vertical axis while translating the article relative to the plate to advance the article surface in rolling motion relative to said plate laterally across the image-shaped layer of powder particles on the plate, simultaneously applying an electric potential to the plate and article to electrically attract the particles from the plate to the article, returning the plate to said second location, cleaning the residue of powder from the plate, and conveying the plate along said first path to return the plate to said first location.

6. In a method as defined in claim 5; the improvement wherein the step of returning the plate to said first location comprises the steps of withdrawing the plate from the screen by pivoting the plate downwardly away from the screen about a horizontal axis extending adjacent one edge of the plate until the layer of powder particles on the plate is disengaged with the screen, and subsequently pivoting the plate about a second horizontal axis parallel to the first to position the plate in a generally horizontal position upon restoration of the plate to said first location.

7. In a method as defined in claim 7; the further improvement wherein the step of rotating and translating the article relative to the plate comprises the steps of supporting the plate in a fixed position in juxtaposition to the article, supporting the article for rotation about its vertical axis, and translating the axis of rotation of the article relative to the plate while rotating the article about the axis.

8. The method as defined in claim 5; the further improvement wherein the step of rotating and translating the article relative to the plate comprises the steps of supporting the article for rotation about its vertical axis at a fixed location, pivoting the plate about a substantially horizontal axis intercepting the vertical axis of rotation of the article at a location vertically spaced from the region of the article to which the image is to be transferred, and rotating the article about its vertical axis as the plate is pivoted about the generally horizontal axis.

9. Offset plate printing apparatus for applying a decorative image to the surface of an article comprising a carrier plate, conveying means for conveying said carrier plate edgewise along an endless path, spaced front and rear support means mounted upon said carrier plate for movement in a direction normal to said carrier plate between a normally maintained retracted conveying position and an outwardly projecting operating position, a generally flat offset plate mounted on said support means to be disposed in generally parallel relationship to said carried plate when said support means are in said conveying position, front and rear pivot means supporting said carrier plate upon said front and rear support means for pivotal movement about respective front and rear axes parallel to said offset plate and to each other, the front axis being located adjacent the front edge of said offset plate, and shifting means located at a selected position along the endless path of said conveying means operable to shift said front and rear support means independently between their normal position and operating position in a predetermined cycle.

10. Apparatus as defined in claim 9 wherein said front support means comprises a front support pin coupled by said front pivot means to said offset plate adjacent the mid point of the front edge of the offset plate, said rear support means comprising a pair of rear support pins located adjacent opposite side edges of said plate in rearwardly spaced relationship from the front support pin, and said shifting means comprises front shifting means for shifting said front support pin and rear shifting means for shifting said rear support simultaneously with each other.

11. Apparatus as defined in claim 9 further comprising first means detachably mounting said carrier plate upon said conveying means, and transfer means located at a transfer location on said endless path for detaching said carrier plate from said first means, bodily moving said carrier plate, support means and offset plate as a unit relative to said conveying means and restoring said carrier plate, support means and offset plate as a unit to said first means for subsequent movement by said conveying means.

12. Offset plate printing apparatus for applying a decorative image to the surface of an article comprising a carrier plate, conveying means for conveying said carrier plate edgewise along an endless path, an elongate front support pin and a pair of elongate rear support pins extending perpendicularly through said carrier plate and mounted upon said carrier plate for longitudinal movement in a direction normal to said carrier plate between a retracted conveying position and an outwardly projecting operating position, a generally flat offset plate, front and rear pivot means mounting said carrier plate upon the outer ends of said front and read support pins for pivotal movement about respective front and rear axes parallel to said offset plate and to each other, the front axis being located adjacent the front edge of said offset plate, spring means independently biasing said support pins to their retracted position wherein said offset plate is disposed in adjacent parallel relationship to said carrier plate, and shifting means located at selected positions along the endless path of said conveying means operable to shift said front and rear support means independently between their normal position and operating position in a predetermined cycle.

13. Apparatus as defined in claim 12 wherein said shifting means comprises front cam means engageable with said front support pin, and rear cam means engageable with said rear support pins to shift said rear support pins simultaneously with each other, said front and rear cam means being synchronized with each other to shift said front and rear pins simultaneously from their conveying positions to their operating positions and to subsequently withdraw the rear pins a predetermined distance from their operating position before withdrawing the front pin from its operating position.

14. Offset plate printing apparatus for applying a decorative image to the surface of an article comprising an offset plate carrier assembly, an offset plate movably supported upon said carrier assembly, plate conveying means for conveying said carrier assembly along an endless first path, stencil screen means mounted adjacent a first location on said first path and operable to apply an image-shaped layer of printing powder particles to said plate, article conveying means for conveying articles to be decorated along a second path to a decorating location in spaced registry with a second location on said first path, intermittent drive means for driving said plate conveying means to advance said carrier assembly along said first path in successive steps of movement to said first location and to said second location, first means at said first location for shifting said plate relative to said assembly into engagement with said stencil screen means and for restoring said plate to its original position on said assembly following operation of said screen means to apply an image-shaped layer of powder particles to said plate, second means at said second location for shifting said plate relative to said conveying means into image transferring relationship with an article on said article conveying means at said decorating location and for restoring the plate to its original position relative to said conveying means after transfer of the image-shaped layer of particles from said plate to said article, and means for transferring said image-shaped layer of particles from said plate to said article while said plate is in image transferring relationship therewith.

15. Apparatus as defined in claim 14 wherein said conveying means comprises a single endless chain operatively trained about a pair of end sprockets mounted for rotation about spaced vertical axes, means supporting said carrier assembly on said chain for pivotal movement about a horizontal axis extending longitudinally of said chain, roller means on said carrier assembly, and track means engaged with said roller for locating said offset plate in a horizontal position at said first location and in a vertical position at said second location.

16. Apparatus as defined in claim 14 wherein said conveying means comprises a pair of endless chains each operatively trained about a pair of end sprockets mounted for rotation about parallel horizontal axes, said chains extending between said end sprockets in parallel horizontal upper runs and said stencil screen means being located above said upper runs, support means on said chains cooperatively supporting said carrier plate therebetween, said second location on said path being midway of the path of travel of said carrier plate about one end sprocket whereat said offset plate is disposed in a vertical position.

17. Apparatus as defined in claim 16 wherein said second means at said second location comprises means operable to shift said plate relative to said carrier assembly while said carrier assembly is supported on said chains by said support means.

18. Apparatus as define in claim 16 wherein said second means at said second location comprises transfer means operable to detach said carrier assembly bodily from said chains and to move said carrier assembly laterally relative to said chains during transfer of the image shaped layer to the article.

19. Offset plate printing apparatus for applying a decorative image to the surface of an article comprising an offset plate carrier assembly, an offset plate, support means mounting said plate upon said carrier assembly for movement relative to assembly, plate conveying means for conveying said carrier assembly along an endless first path wherein said plate is disposed in a horizontal position at a first location on said plate and in a vertical position at a second location on said path, horizontally disposed stencil screen means mounted at said first location and operable to apply an image-shaped layer of printing powder particles to said plate, article conveying means for conveying articles to be decorated in an upright position along a second path to a decorating location in spaced registry with said second location on said first path, intermittent drive means for driving said conveying means to advance said carrier assembly along said first path in successive steps of movement to said first location and to said location, first means operable when said carrier assembly is, at said first location for shifting said support means to move said plate relative to said carrier assembly into horizontal engagement with said stencil screen means and to return said plate to its original position on said carrier assembly following operation of said screen means to apply an image-shaped layer of powder particles to said plate, second means operable when said carrier assembly is at said second location for shifting said support means to project the plate from the carrier assembly into image transferring relationship with an article on said article conveying means at said decorating location and to restore the plate to its original position on said carrier assembly after transfer of the image-shaped layer of particles from said plate to said article, and means for transferring said image-shaped layer of particles from said plate to said article while said plate is in image transferring relationship therewith.

20. Apparatus as defined in claim 19 wherein said conveying means comprises a single endless chain operatively trained about a pair of end sprockets mounted for rotation about spaced vertical axes, means supporting said carrier assembly on said chain for pivotal movement about a horizontal axis extending longitudinally of said chain, roller means on said carrier assembly, and track means engaged with said roller for locating said offset plate in a horizontal position at said first location and in a vertical position at said second location.

21. Apparatus as defined in claim 19 wherein said conveying means comprises a pair of endless chains each operatively trained about a pair of end sprockets mounted for rotation about parallel horizontal axes, said chains extending between said end sprockets in parallel horizontal upper runs and said stencil screen means being located above said upper runs, support means on said chains cooperatively supporting said carrier plate therebetween, said second location on said path being midway of the path of travel of said carrier plate about one end sprocket whereat said offset plate is disposed in a vertical position.

22. Offset plate decorating apparatus for applying a decorative image to a side surface of revolution of an article such as a tumbler, bottle or the like comprising offset plate means, conveying means for conveying said plate means along an endless path having an image preparation station and an image transfer station at spaced locations thereon, coupling means detachably mounting said plate means upon said conveying means, image application means at said image preparation station for applying a layer of printing powder particles to said plate means while said plate means is supported in a substantially horizontally position, article support means for supporting an article to be decorated for rotation about the axis of revolution of the surface to be decorated with the axis in a vertical position at a location in spaced adjacent relationship to said image transfer station, plate transfer means at said image transfer station for detaching said plate means from said conveying means and shifting said plate means into a generally vertically disposed operative registry with an article supported upon said article support means, and means on said transfer means for driving said plate means along a predetermined path and simultaneously rotating the article about its axis of revolution to cause a relative rolling of the article surface laterally across the layer of particles on said plate means.

23. Decorating apparatus as defined in claim 22 wherein said plate means comprises a carrier plate having a first group of pin receiving detent means therein, a first group of pins on said conveying means engageable with said first group of detent means to constitute said coupling means, a second group of pin receiving detent means in said carrier plate, and a second group of pins on said plate transfer means engageable with said second group of detent means to support said plate means on said transfer means.

24. Offset plate decorating apparatus for applying a decorative image to a side surface of revolution of an article such as a tumbler, bottle or the like comprising offset plate means, conveying means for conveying said plate means along an endless path having an image preparation station and an image transfer station at spaced locations thereon, coupling means detachably mounting said plate means upon said conveying means, image application means at said image preparation station for applying a layer of printing powder particles to said plate means, said layer having a shape corresponding to a development of the desired article image shape about a first axis offset from and substantially perpendicular to said plate means, article support means for supporting an article to be decorated for rotation about the axis of revolution of the surface to be decorated at a location in spaced adjacent relationship to said image transfer station, plate transfer means at said image transfer station for detaching said plate means from said conveying means and shifting said plate means into operative registry with an article supported upon said article support means with said first axis intersecting the axis of revolution of the article in substantially perpendicular relationship thereto, and swing means on said transfer means for swinging said plate means in an arc about said first axis and simultaneously rotating the article about its axis of revolution to cause a relative rolling of the article surface laterally across the layer of particles on the plate.

25. Decorating apparatus as defined in claim 24 wherein said plate means comprises a carrier plate having a first group of pin receiving detent means therein, a first group of pins on said conveying means engageable with said first group of detent means to constitute said coupling means, a second group of pin receiving detent means in said carrier plate, and a second group of pins on said plate transfer means engageable with said second group of detent means to support said plate means on said transfer means.

26. Apparatus as defined in claim 24 wherein said swing means comprises a swing arm element having means thereon for supporting said plate means, first means for driving said swing arm element horizontally in a direction normal to said first axis, second means supporting said swing arm element on said first means for pivotal movement about a second axis parallel to and offset from said first axis, third means supporting said swing arm element for movement radially of said second axis, and cam means constraining said swing arm element to move in an arc about said first axis.

27. An offset plate decorating process for electrostatically applying an image to a surface of revolution of a hot glass article comprising the steps of supporting and guiding an offset plate for movement along an endless path on which said plate is disposed in a horizontal position at a first location on said path and in a vertical position at a second location on said path, advancing said plate along said path to said first location, applying an image-shaped layer of colorant frit particles to said plate at said first location, advancing said plate along said path from said first location to said second location, locating an article to be decorated in spaced relationship to said plate at said second location with the axis of revolution of the surface to be decorated in a vertical position, projecting said plate outwardly from said path into operative alignment with said surface, moving said plate and said article relative to each other to cause a rolling motion of said article surface about said axis laterally across the image-shaped layer of particles on said plate while simultaneously electrically attracting the particles from the plate to the article surface, restoring the plate to said second location, and then advancing the plate along said first location.

28. The process defined in claim 27 wherein the step of applying the image-shaped layer to said plate comprises the steps of locating a horizontally disposed stencil screen having an image-defining aperture in spaced relationship above said path, elevating the plate from the path into engagement with the lower side of the screen, expressing the frit particles through the image aperture onto the plate, and disengaging the plate from the screen by pivoting the plate downwardly about an edge of the plate.

29. The process defined in claim 27 wherein the step of relatively moving the article and plate comprises the steps of supporting the article upon a circular platform freely rotatable about a vertical axis coincident with the axis of revolution of the article surface, frictionally engaging the edge of the platform with a member attached to the plate, and advancing the platform horizontally across the surface of said plate while maintaining the frictional contact between the platform and member.

30. The process defined in claim 27 wherein the step of relatively moving the article and plate comprises the steps of supporting the article upon a circular platform freely rotatable about a vertical axis coincident with the axis of revolution of the article surface, frictionally engaging the edge of the platform with a member attached to the plate, and shifting the plate with a horizontal component of motion in a direction tangential to said vertical axis while holding said axis stationary.

31. The process as defined in claim 30 for decorating a frusto-conical surface wherein the step of shifting the plate comprises pivoting the plate about a substantially horizontal axis intersecting said vertical axis approximately at the imaginary apex of the frusto-conical surface.

32. Offset plate decorating apparatus for decorating glass articles comprising an article conveyor for conveying articles in succession to a decorating station, an offset plate, offset plate conveying means for conveying said offset plate along an endless path from an image application station to an image transfer station located adjacent said decorating station in step by step movement synchronized with the movement of articles to said decorating station, image application means at said image application station operable to apply an image shaped layer of printing powder particles to said plate when said plate is located at said application station, said image application means comprising at least one stencil screen having a series of image defining apertures there through, a supply of printing powder particles supported at one side of said screen, means for locating said offset plate at the opposite side of said screen in registry with said image defining apertures, and means operable upon the location of said plate in registry with apertures for transferring printing powder particles from said supply through the apertures of said screen under the surface of said plate, and image transfer means at said image transfer station operable to register said plate with an article at said decorating station and to transfer the image shaped layer of particles applied to said plate at said image application station from said plate to the surface of the article.

33. Apparatus as defined in claim 32 wherein said image application means comprises at least two stencil screens each having a series of image defining apertures therethrough spaced along said plate conveying means by a distance corresponding to the step-by-step movement of said plate on said conveying means, a supply of printing powder particles supported at one side of both screens, the supply of particles at one screen being of a first color and the supply of particles at the other screen being of a second color, means operable at the completion of one step of movement of said conveying means for locating said offset plate at the opposite side of said one screen in registry with the image apertures of the one screen, means operable when said plate is in registry with the image apertures of the one screen for transferring printing powder particles from the supply at said one screen through the apertures of the one screen onto the surface of the plate prior to the commencement of the next step of movement of said plate on said conveying means, means operable at the conclusion of the next step of movement of said plate on said conveying means for locating said plate at the opposite side of the other of said screens in registry with the image apertures therein, and means for transferring printing powder particles from the supply associated with the other of said screens through its image apertures onto the surface of said plate to thereby form a multicolored image-shaped layer of patricles on said plate.

34. Offset plate decorating apparatus for decorating articles comprising an article conveyor for conveying articles in succession to a decorating station, a plurality of offset plates, offset plate conveying means for conveying said offset plates along an endless path from an image application station to an image transfer station located adjacent said decorating station in step by step movement synchronized with the movement of articles to said decorating station, said offset plates being mounted upon said offset plate conveying means in uniformly spaced relationship corresponding to the step by step movement of said plates along said endless path wherein each step of movement advances each plate into the position occupied by a preceding plate prior to the step of movement, image application means at said image application station operable to apply an image shaped layer of printing powder particles to said plates when said plates are located at said application station, said image application means comprising a plurality of individual stencil screens each having a series of image defining apertures therethrough at locations spaced along said conveying means in correspondence with the spacing between said offset plates, a supply of printing powder particles at one side of each screen, means operable upon the completion of one step of movement of said plates along said endless path for registering a first group of said plates with the image defining apertures of a corresponding number of stencil screens at the opposite sides of said screens from the supplies of powder particles, means operable while said first group of plates is in registry with said stencil screens for transferring printing powder particles through the apertures of said screens onto the plates in registry therewith prior to the next step of movement of said plates along said endless path, an image transfer means at said image transfer station operable to register said plates with articles at said decorating station and to transfer the image shaped layers of particles from said plates to the surfaces of the articles.

35. Apparatus as defined in claim 34 wherein the image defining apertures of all of said screens are of like configuration whereby like images are simultaneously applied to all plates of said first group, each step of movement of said plates on said conveying means being of a length such that upon movement of said first group of plates along said conveying means from said screens a second group of plates equal in number to said first group is registered with said screens, and means at said image transfer means for simultaneously registering all of said first group of plates with a corresponding number of articles for simultaneous transferring of images from said plates to said articles.

36. Apparatus as defined in claim 34 wherein the distance of one step of movement of said plates on said conveying means is equal to the distance between successive plates, said supplies of powder being of different colors and said image apertures differing between said screens whereby said image application means applies a multicolor image to each plate for transfer to said article.

References Cited

UNITED STATES PATENTS

| | | | |
|---|---|---|---|
| 2,700,629 | 1/1955 | Townsend | 101—177 XR |
| 1,706,038 | 3/1929 | Owens | 101—129 |
| 2,014,372 | 9/1935 | Brickell | 101—219 |
| 2,117,427 | 5/1938 | Killy | 101—115 |
| 2,088,196 | 7/1937 | Friden | 101—38 |
| 2,125,457 | 8/1938 | Merritt | 101—129 |
| 2,195,625 | 4/1940 | Knaggs | 101—38 |
| 2,198,565 | 4/1940 | Schutz et al. | 101—40 |
| 2,347,022 | 4/1944 | Austin | 101—129 |
| 2,361,325 | 10/1944 | Shurley | 101—38 |
| 2,484,671 | 10/1949 | Bauman. | |
| 2,502,926 | 4/1950 | Chadwick et al. | 101—129 |
| 2,904,916 | 9/1959 | Stahmann | 101—114 |
| 3,096,709 | 7/1963 | Eldred et al. | 101—115 |
| 3,112,692 | 12/1963 | Cookson | 101—38 |
| 3,238,053 | 3/1966 | Morgan. | |
| 3,253,540 | 5/1966 | Lusher. | |
| 3,245,341 | 4/1966 | Childress et al. | 101—115 |
| 3,276,358 | 10/1966 | Lusher | 101—129 |

ROBERT E. PULFREY, *Primary Examiner.*

E. S. BURR, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,404,624                                October 8, 1968

James R. Proffitt, Jr.

It is certified that error appears in the above identified patent and that said Letters Patent are hereby corrected as shown below:

Column 1, line 25, "employement" should read -- employment --. Column 7, line 1, "rotable" should read -- rotatably --. Column 14, line 46, "th" should read -- the --. Column 17, line 25, "7" should read -- 5 --; line 53, "carried" should read -- carrier --. Column 18, line 21, "read" should read -- rear --. Column 20, line 26, "horizontally" should read -- horizontal --.

Signed and sealed this 3rd day of March 1970.

(SEAL)
Attest:

Edward M. Fletcher, Jr.                        WILLIAM E. SCHUYLER, JR.
Attesting Officer                                Commissioner of Patents